Oct. 10, 1967  F. EHRLICH  3,346,417
METHOD OF AND APPARATUS FOR TREATING METAL SCRAP, PARTICLES OR
THE LIKE CONTAMINATED WITH VOLATILE AND/OR
COMBUSTIBLE SUBSTANCES
Filed Aug. 6, 1963
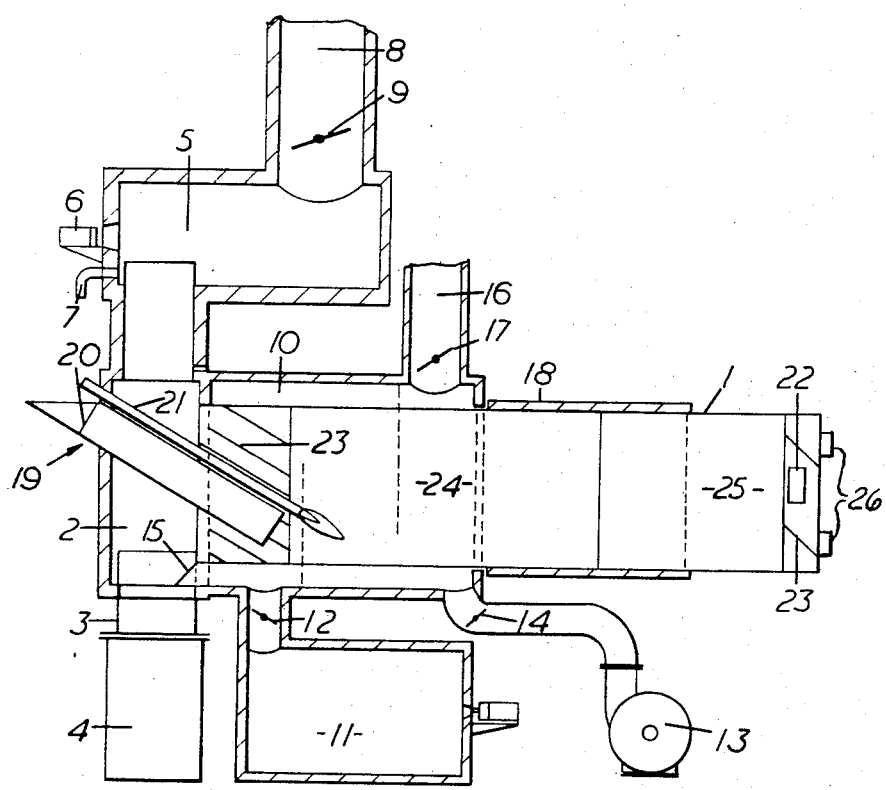
Inventor
Friedrich Ehrlich
By
Wilmer Mechlin, Attorney

United States Patent Office 3,346,417
Patented Oct. 10, 1967

3,346,417
METHOD OF AND APPARATUS FOR TREATING METAL SCRAP, PARTICLES OR THE LIKE CONTAMINATED WITH VOLATILE AND/OR COMBUSTIBLE SUBSTANCES
Friedrich Ehrlich, Wendover, England, assignor to International Alloys Limited, Aylesbury, England
Filed Aug. 6, 1963, Ser. No. 300,357
5 Claims. (Cl. 134—2)

This application is a continuation-in-part of my application, Ser. No. 171,176, filed on Feb. 5, 1962, now abandoned.

This invention relates to a method of and apparatus for treating metal scrap particles or the like, hereinafter referred to simply as "scrap," contaminated with volatile and/or combustible substances.

The scrap with which the present invention is primarily concerned is foil, swarf, turnings or the like of aluminium, aluminium alloys or magnesium alloys. In the case of swarf, turnings or the like, such scrap may not contain more than a small proportion of readily combustible matter which is usually in the form of oil and is frequently combined with considerable quantities of water. It will be understood that the melting point of aluminium and magnesium, and their alloys, is relatively low, so that great care requires to be taken when decontaminating the scrap that the risk of the scrap melting or becoming oxidised does not occur.

The convenient and economic melting of metal scrap such as turnings requires preparatory treatment for the removal from the scrap of contamination by water, oil, and other organic waste such as fibres and sawdust. A plant which has been proposed for this purpose is a rotating drum, slightly sloping with respect to the horizontal, in which the turnings travel downwards and are in contact with hot gases produced by the flame of a burner arranged axially at the lower end of the drum. In other proposals hot gases are produced in a separate combustion chamber and, after their temperature has been adjusted to a desired range, generally of about 200–350° C., which is high enough to evaporate oil contamination and low enough to avoid ignition of the fume, these gases are passed through the drum where they remove any oil and water by evaporation and carry it away through a stack or waste duct.

These installations have been subject to criticism for various reasons. Those installations with open flames were difficult to control so as to be able to deal with the wide variations in the constitution of the contaminants, which may range from 30% water and 3% oil to no water and 10% oil or more. In the case of high oil and low water content the heat produced by the burning oil raises the temperature in the drum so much that danger of melting or oxidizing the metal scrap could only be avoided by reducing the throughput to uneconomic rates. In the case of low oil content and high water content it is difficult to maintain the burning of the oil, and oily fumes tend to be produced which, owing to uncontrolled admixture of air, often result in fires and explosions in the flue and stack.

In the proposals utilising a stream of hot gases of predetermined temperature for drying without igniting the fumes in the drum, a large amount of objectionable oily fumes are produced which are difficult to clean and to dispose of.

In the aforesaid proposals, but particularly in the one using combustion gases cooled to a fixed temperature, the gas current has a considerable velocity because at the comparatively low temperature of operation and the narrow temperature range to be adhered to, large volumes of gas are necessary to evaporate the moisture. This high gas velocity requires devices (e.g. cyclones) for the deposition of fines carried away, and leads to heavy oily inflammable deposits in the waste ducts which often ignite spontaneously and cause troublesome fires. Afterburners were occasionally arranged in the waste duct but did not cope effectively with the wide variety of gas compositions leaving the dryer.

The primary object of the present invention is to provide for the avoidance simultaneously of overheating scrap being decontaminated and the discharge of fumes from the decontaminating apparatus.

A further object is to provide apparatus which is simple and economic to operate and which is capable of treating scrap contaminated with substances of widely differing compositions.

Yet a further object is to provide for maintaining an economic rate of throughput of contaminated scrap through the apparatus without the risk of melting or oxidising the scrap.

By way of example an embodiment of the apparatus of the invention is diagrammatically illustrated in sectional elevation by the accompanying drawing.

The main body of the illustrated apparatus is a rotating drum 1 substantially closed at one end, its axis arranged nearly horizontally but preferably with a slight slope towards the closed end. The open end of this drum, i.e. the left end in the illustration, is surrounded by a smoke box 2 which is preferably lined with refractory. The gap between the end of the rotating drum and the corresponding opening of the smoke box is kept to the practicable minimum. The smoke box has an opening 3 at the lowest end leading into a removable pocket 4 for the discharge of fine solid particles which may be deposited from the fumes. The top end of the smoke box is connected by a very short and wide duct to an afterburner; this is a chamber 5 of elongated shape having a burner 6 and an adjustable air control valve 7 for the introduction of secondary air near the end where the fumes enter the chamber from the smoke box and having a connection to a stack 8 at or near the opposite end. A damper 9 is arranged between the afterburner chamber and the stack for control of the draught.

Starting from the smoke box, about a quarter to half of the length of the drum is enclosed in a steel casing or jacket 10, preferably carrying internal baffles, which has the purpose of heating or cooling the drum as required for control of the temperature within the desired range between 300–450° C., whereby to maintain the temperature of the drum substantially at the flash point of oil in the contaminants of the scrap. This is of particular importance where the contaminants contain a large proportion of water which might cool the drum to a temperature below the flash point of the oil. For heating, the casing 10 is connected to the discharge end of a source of hot gases, for instance a small furnace 11 discharging a mixture of combustion gases and air of automatically controlled temperature. If cooling of the drum is required the connection with the source of hot gases is closed by a damper or valve 12, and a cooling fan 13 is allowed to discharge cool air into the jacket through a suitable control valve 14. The gases discharged from the heating and cooling jacket 10 can alternatively discharge into the smoke box through an appropriate damper 15 or into a separate exhaust duct 16 for disposal through an appropriate damper 17. This allows the use of the heating gases for the pre-heating of the smoke box when starting up from cold.

The walls of the drum 1 between the end of the jacket 10 and a point nearer to the discharge end carry on the outside a layer of insulation 18 equal to about two inches of magnesia in order to assist in maintaining the temperature in the interior above the dew point of the gases circulating in the drum.

A charging device, for example a chute 19, is arranged at the end of the drum joining the smoke box 2 allowing the continuous introduction of the metal scrap to be dried, and this is equipped with a simple seal, for instance a flap 20, preventing excessive air ingress. Above the point where the scrap enters the drum 1 from the charging device, one or several pilot burners 21 are arranged. The pilot burners have their own forced air supply so that they burn independently of the presence of air in the atmosphere inside the drum and ensure combustion of contaminants which, if ignited by the heat of the jacket alone, would probably result in an explosion in the drum.

Near the discharge end of the drum 1 a small number, generally three to four of openings 22, preferably equipped with flaps which open only at the moment of discharge, are disposed along the circumference of the drum. Through these openings the dry scrap leaves the drum for collection in containers or conveyors leading to further treatment plant, for example magnetic separators. The discharge end is also provided with valve-controlled air inlet means 26.

Inside the drum 1 flights 23 and paddles 24 are arranged for the agitation and axial transport of the scrap. It is advantageous to incline the paddles and flights in a direction opposite to the sense of rotation, forming an angle of approximately 20–45° with the radius of the drum, so as to make the scrap cascade down along the rising wall of the drum rather than fall freely through the diameter. This arrangement not only reduces the danger of fine metal particles being overheated and oxidized in the flame but also reduces the possibility of them being carried away by the stream of gases and deposited in the fume ducts and the afterburner. In conventional plant, fines to the amount of 4% to 5% of the charge weight are often carried out of the drum by the strong gas current, and a cyclone is usually needed in order to prevent them from being discharged into the stack. As mentioned before, these deposits are objectionable, difficult to dispose of and can cause fires. In the apparatus of the invention where the gas velocity is near the theoretical minimum, the quantity of fines carried away has been found to be reduced to about 1% to 1½%, which obviates the necessity of using a cyclone. The paddles 24 which give most agitation are restricted to the hottest part of the drum, that is the part enclosed by the jacket. Spiral flights 23 are used at both ends and practically straight longitudinal flights 25 for the remainder.

In operation, the furnace 11 is lit and the various dampers 12, 14, 15, 17 are set so as to guide the stream of hot gases, adjusted to a temperature of approximately 600° C., into the heating jacket 10 and then through the smoke box 2 and the afterburner chamber 5 to the stack 8. The burner 6 of the afterburner is also lit to heat the refractory lining to approximately 750–900° C. The drum 1 is rotated without charging any scrap in order to achieve uniform heating of the part surrounded by the jacket 10. When the wall of the heated part of the drum has reached a temperature of the order of 450° C. the pilot burners 21 are lit and charging of scrap through the chute starts. Any oil in the turnings will start burning very shortly after the first scrap enters the drum. At this moment the jacket damper 15 may be closed and/or the separate exhaust duct damper 17 opened according to whether the combustion of oil from the turnings in the smoke box produces enough heat to maintain the temperature in it. The drum, the exhaust conduit and the afterburning means constitute a continuous combustion zone.

By manual, or automatic operation of the controls of the furnace 11 and, if necessary, using the cooling fan 13 the temperature in the heated end of the drum is now maintained in a range about 450° C. while charging scrap at the scheduled rate; drying can then proceed continuously.

In order to prevent the discharge of smoke from the plant into the building the draught in the stack 8 has to be kept large enough to maintain a very small negative pressure at all points on both ends of the drum. Further the temperature of the lining of the afterburner chamber 5 must be maintained above approximately 750° C. and the secondary air control valve 7 operated to maintain a sufficient oxygen excess in the afterburner chamber.

To prevent condensation of oil and water in the cooler part of the drum 1 near the discharge end when starting up from cold it is advantageous to provide some heating in this part, for example, by arranging an auxiliary burner axially at the discharge end.

When treating material other than turnings or other scrap having solid organic contamination, for example foil backed paper or plastic the established method is to burn the organic matter with a great excess of cold air so as to avoid overheating. Generally arrangements not much different from the ones for treating oily turnings in a drum with open flame heating are used. In view of the generally large proportion of organic matter a very low throughput only is possible if overheating of the metal is to be avoided and the strong draught produced by the large air excess through the stack causes an obnoxious discharge of charred particles. The apparatus according to the present invention represents a great improvement in the treatment of this type of scrap. The controlled air supply in the rotating drum 1 produces a partial combustion of the organic matter with limited heat evolution which, together with cooling by the jacket 10, enables the temperature in the drum to be kept below danger point though maintaining a reasonable throughput. Most of the char produced in the limited combustion process is shaken off the metal particles by the agitation in the drum and carried into the afterburner chamber 5 where it is burnt completely preventing any carbon dust from being discharged from the stack 8. The treated material is dry and clean with ony a small quantity of char adhering in recesses.

It is advantageous when dealing with material in larger pieces, for example sheets of foil, to break it up into shreds of approximately two inch size before treating. This can be done for instance by passing it through a hammer mill of known design.

In the apparatus according to the invention the burning of the combustible impurities is enforced at all times by control of the temperature in the drum 1, and by self-contained pilot flames. The burning takes place only adjacent to the charging end, and the combustion gases are extracted at this end. At the same time the air intake of the drum is restricted by the valve-controlled air inlet means so as to limit the quantities of combustible impurities burning in the drum, thus keeping the temperature there below the dangerous range. The unburnt part of the fumes, if any, escaping from the drum is burnt partly in a smoke box 2—and partly together with more secondary air—in the afterburner chamber 5. For further control of the temperature and for establishing the proper temperature distribution before starting up the plant, outside heating of a part of the drum 1 adjacent to the charging end is provided by means of the jacket 10 which encloses this part of the drum and through which hot gases from the combustion chamber 11 are flowing. In case of very high oil content of the scrap the same jacket 10 can be used for cooling the drum 1 by cutting off the combustion chamber 11 and connecting a fan 13 to the jacket.

The enforced presence of flames in all places between the drum 1 and the stack 8 is a positive safeguard against explosions, as no explosive gases or dust can accumulate under these conditions. The control of temperature in the important zone of the drum near the charging end while enabling the consistent maintenace of flames in this zone also enables an economic rate of throughput being maintained over a great variety of oil and water contents in the scrap charged.

As a result of the invention a much improved method and apparatus for treating contaminated metal scrap are provided. The invention is suitable for the removal of solid organic admixtures contaminating fine metallic particles, for example paper, paint or plastic backing on metallic foil.

The following examples give the results achieved with the apparatus and the method of the invention as compared with those achieved with a known apparatus and method:

Example 1

Two parcels of aluminium alloy turnings containing approximately 13% of a mixture of oil and water contaminants were treated in two apparatus in parallel. Apparatus No. 1 was a conventional type generally as described in the last sentence of column 1 of the opening to this specification and operating with gases at a temperature of 350° C. Apparatus No. 2 was constructed in accordance with the present invention with a drum of approximately the same dimensions as Apparatus No. 1, having a cross section of the air intake openings of 120 square inches and a drum temperature of approximately 450° C.

Analysis of the treated material was as follows:

|  | Apparatus No. 1, percent by weight | Apparatus No. 2, percent by weight |
| --- | --- | --- |
| Moisture | 3.4 | 1.6 |
| Metallic aluminium alloy | 93 | 98 |
| Magnetic iron particles | .3 | .1 |

The moisture analysis showed that the apparatus of this invention reduced the oil and water content to less than half of the content in turnings treated by a conventional apparatus.

The figures for metallic aluminium alloy available indicated that the content of non-volatile combustibles had been reduced considerably. The difference in metallic alloy was 5%. By deducting from this the improvements in moisture (1.8%) and in magnetic iron particles (0.2%), there resulted an improvement in other non-metallic contamination (essentially solid combustibles) of 3%.

The reduction in contamination of magnetic iron particles was a measure of the physical dryness of the turnings which prevented the iron particles from sticking to the aluminium particles and thus enhanced the efficiency of the magnetic separator to which the parcel was fed for final treatment. The separation of iron particles is important as it controls the contamination with iron of the alloys produced by melting the treated turnings.

In all three contents analysed, the apparatus of the invention was superior to the conventional apparatus.

Example 2

The results of prolonged operation under production conditions on parcels comprising the normal range of composition of aluminium turnings (moisture content 3.6–21.5%) of the same two apparatus were found to be as follows:

|  | Apparatus No. 1 | | Apparatus No. 2 | |
| --- | --- | --- | --- | --- |
|  | Mean | Range | Mean | Range |
| Hourly throughput, lbs. charged/hr | 1,214 | 1,002–1,337 | 1,962 | 1,660–2,329 |
| Approximate moisture content after treatment, percent | 2.1 | 2–3 | 1.1 | 1.0–1.6 |
| Approximate content of magnetic iron particles after treatment, percent | .3 |  | .1 |  |

These results confirmed the quality improvement obtained by apparatus of the invention and demonstrated the large improvement in output achieved without increase in the size of the apparatus as compared with conventional apparatus.

I claim:

1. A method of treating contaminated metal scrap comprising the steps of imparting rotary and longitudinal motion to the scrap in a rotary drum having scrap entry and discharge ends, subjecting said scrap to a temperature at the entry end in the range 300° C. to 450° C., passing a controlled current of air countercurrently from discharge end to entry end through the moving scrap to remove any volatile substances, applying a pilot flame to the interior of the drum at said entry end to maintain a continuous zone of flame in said drum to promote at least partial combustion of any combustible substances, withdrawing the combustion and other gases at said entry end, subjecting these gases to an afterburning process to obviate discharge of fumes from said drum to atmosphere, controlling said current of air and admitting further air as necessary adjacent the afterburning flame to control the rate of combustion, and circulating temperature conditioned gases around the exterior of the drum along part of the length thereof intermediate said ends for controlling the temperature within the drum within a range determined by the flash point of combustible material in said scrap and the maximum temperature said scrap can withstand without risk of melting or oxidation.

2. Apparatus for treating contaminated metal scrap, comprising, in combination, a rotatable drum; means for feeding scrap through the drum from an entry point at one end of said drum to an exit point at the opposite end of said drum; pilot burning means with its own air supply adjacent to said entry point to maintain a continuous zone of flame adjacent to said entry point; means for creating a gas flow through the drum in a direction opposite to the scrap feed which means includes adjustable air inlet means at the scrap exit point an exhaust conduit adjacent said entry point for ducting the gas flow from the drum and afterburning means in said exhaust duct providing a flame to the gas flow after it has left the drum to obviate discharge of fumes from said apparatus; and temperature control means around part of the length of the drum intermediate said ends for controlling the temperature of said part within a range determined by the flash point of the contaminating substance and the maximum temperature said scrap can withstand without risk of melting or oxidation.

3. Apparatus as claimed in claim 2, in which said temperature control means includes a jacket for the drum for the circulation of temperature conditioned gases.

4. Apparatus as claimed in claim 2, in which said temperature control means includes a jacket for the drum for the circulation of temperature conditioned gases, said jacket having two oulets discharging selectively to atmosphere and to the exhaust conduit.

5. Apparatus as claimed in claim 2, in which the afterburning means also provides an air addition to the gas flow.

References Cited

UNITED STATES PATENTS

| 2,247,823 | 7/1941 | Somes | 75—65 |
| 2,477,796 | 8/1949 | Germany | 266—5 |
| 2,852,418 | 9/1958 | MacDonald | 134—2 |
| 2,948,525 | 8/1960 | West | 266—18 |
| 2,964,309 | 12/1960 | Rouaux | 266—18 |
| 2,977,255 | 3/1961 | Lowry | 266—33 |

JOSEPH SCOVRONEK, *Acting Primary Examiner.*

MORRIS O. WOLK, *Examiner.*

J. T. ZATARGA, *Assistant Examiner.*